United States Patent
de Koning

(10) Patent No.: US 6,835,042 B2
(45) Date of Patent: Dec. 28, 2004

(54) ROBOTIC LOADING CELL FOR MOLDED UTENSILS

(75) Inventor: Johannes J. M. de Koning, Glen Allen, VA (US)

(73) Assignee: Flexicell Inc., Ashland, VA (US)

( * ) Notice: Subject to any disclaimer, the term of this patent is extended or adjusted under 35 U.S.C. 154(b) by 135 days.

(21) Appl. No.: 10/178,185

(22) Filed: Jun. 21, 2002

(65) Prior Publication Data

US 2003/0234157 A1 Dec. 25, 2003

(51) Int. Cl.⁷ .................................................. B26F 3/00
(52) U.S. Cl. ...................... 414/736; 414/741; 53/446; 53/247; 264/297.8; 225/101; 225/106
(58) Field of Search .................... 414/736, 738–741, 414/751.1, 753.1; 53/443, 445–447; 264/297.8, 297.2, 297.3; 225/101, 106

(56) References Cited

U.S. PATENT DOCUMENTS

| | | | |
|---|---|---|---|
| 3,889,448 A | 6/1975 | Russell | |
| 3,902,587 A | 9/1975 | Checcucci | |
| 4,814,134 A | 3/1989 | Brown | |
| 4,915,611 A | 4/1990 | Brown | |
| 4,938,338 A | 7/1990 | Crawford et al. | |
| 5,044,876 A | 9/1991 | Stohlquist | |
| 5,237,801 A | 8/1993 | Hillam et al. | |
| 5,329,746 A | * 7/1994 | Vulliez | 53/111 R |
| 5,528,883 A | 6/1996 | Jamison | |
| 5,634,547 A | 6/1997 | Belanger et al. | |
| 5,809,751 A | 9/1998 | Braibanti | |
| 5,855,932 A | * 1/1999 | Bright et al. | 425/444 |
| 6,202,387 B1 | 3/2001 | Brown et al. | |
| 6,217,275 B1 | * 4/2001 | Seki | 414/751.1 |
| 6,427,893 B1 | * 8/2002 | Penrod et al. | 225/106 |

FOREIGN PATENT DOCUMENTS

JP 6-155519 6/1994

* cited by examiner

Primary Examiner—Christopher P. Ellis
Assistant Examiner—Mark A. Deuble
(74) Attorney, Agent, or Firm—Lawrence E. Laubscher, Jr.

(57) ABSTRACT

A robotic loading cell for plastic utensils is characterized by a synchronized supply conveyor and gripping mechanism for packaging individual utensils from an integrally molded group or rack of utensils. The gripping device is operable to remove a plurality of individually stacked utensils from the integral racks. A robotic transfer mechanism connected with the gripping device transfers the utensils to a packaging assembly. Operation of the conveyor, gripper and robotic transfer device is coordinated through a programmed controller.

8 Claims, 5 Drawing Sheets

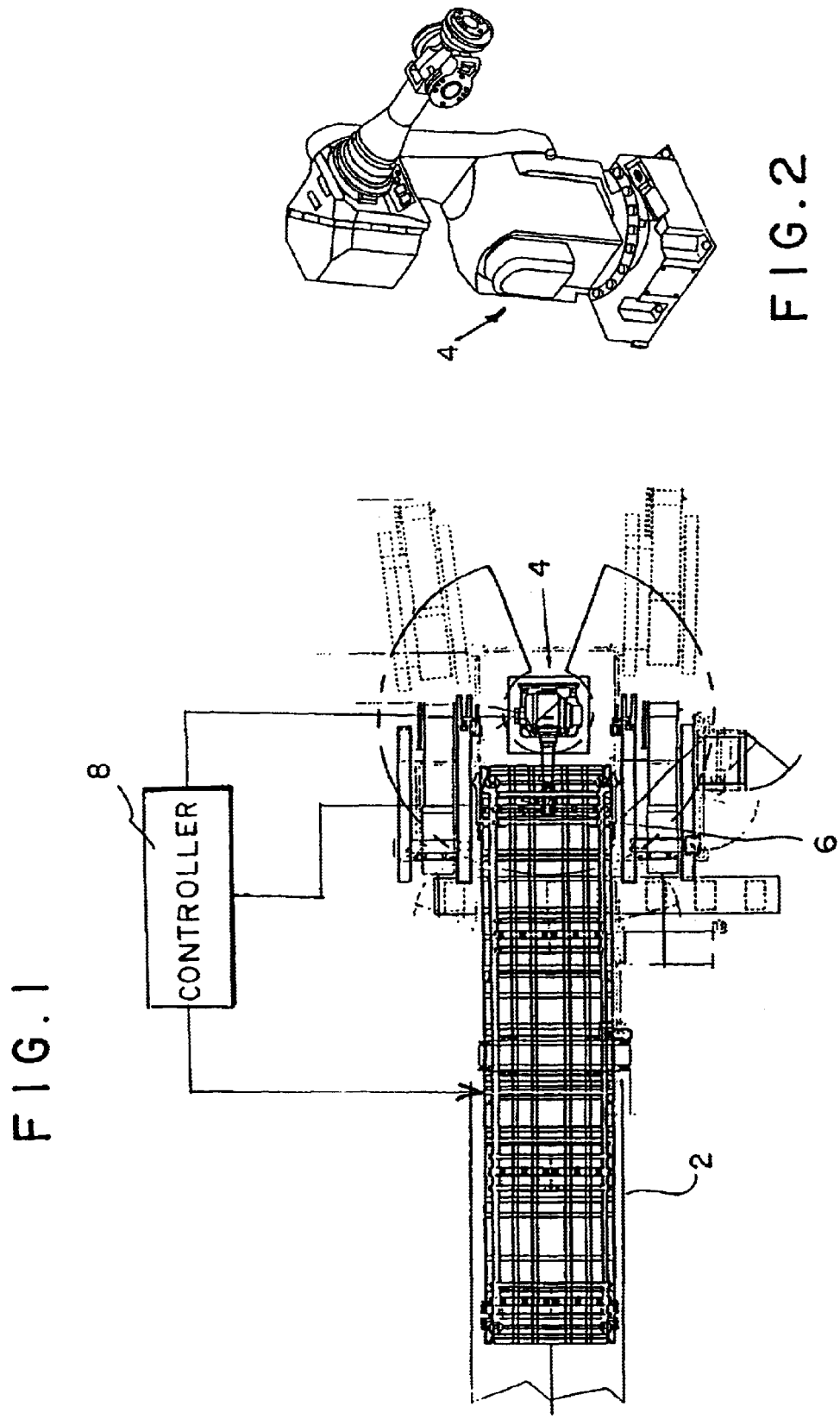

ROBOTIC LOADING CELL FOR MOLDED UTENSILS

BACKGROUND OF THE INVENTION

Many disposable eating utensils such as forks, knives, and spoons are molded from synthetic plastic material. A pair of mold plates have opposing surfaces containing cavities to form a plurality of identical utensils. The cavities are interconnected via channels which are used to supply heated synthetic plastic to the cavities. After the plastic cools and sets, the molded utensils are ejected. The utensils remain interconnected by excess plastic (i.e. runners) from the channels. Depending on the configuration of the mold, any number of utensils are simultaneously molded to form a group of interconnected utensils. The groups of utensils are referred to as racks. The present invention relates to a robotic loading cell for severing the utensils from the molded groups of utensils and packaging the utensils in bags without human intervention.

BRIEF DESCRIPTION OF THE PRIOR ART

Automated loading devices are well known in the patented prior art. The U.S. Patent to Belanger et al. U.S. Pat. No. 5,634,547, for example, discloses an apparatus for handling irregularly shaped items such as plastic cutlery wherein the items are removed from a hopper, aligned and separated, and delivered to a conveyor.

While such devices operate satisfactorily, they are not suitable for receiving items from a mold which are joined together. That is, a separate device is required to sever individual utensils from a group of simultaneously molded utensils.

The present invention was developed in order to overcome this and other drawbacks of prior utensil packaging devices by providing a device which both severs a plurality of utensils from molded groups of utensils and transfers the severed utensils to a packaging device. Successive severing and transferring of the utensils greatly increases the speed and capacity of the loading device.

SUMMARY OF THE INVENTION

Accordingly, it is a primary object of the invention to provide an apparatus for loading molded plastic utensils including a first conveyor which supplies groups of molded utensils in stacked relation from a mold. Each group includes a planar array of identical utensils which are interconnected via a runner. A gripper device is operable to grip a plurality of aligned and stacked individual utensils and remove them from their respective groups. A robotic transfer mechanism is connected with the gripper device to transfer the stacked individual utensils to a packaging assembly. The transfer mechanism then returns the gripper device to the stacked groups of molded utensils for gripping the next stack of individual utensils. This process is repeated until all of the utensils of the stacked group have been severed and transferred to the packaging assembly. The first conveyor is then driven to supply another plurality of stacked groups of utensils to the gripper device.

According to a more specific object of the invention, the gripper device includes two pairs of elongated parallel fingers which are laterally displaceable between a gripping position where the fingers are moved toward each other to grip a stack of utensils therebetween and a release position where the fingers are moved away from each other to release the utensils. When the fingers are in the gripping position with a stack of utensils gripped therebetween, the gripper is rotated about an axis to break the utensils away from the corresponding runners.

According to yet another object of the invention, the first conveyor includes a clamping mechanism for clamping the runners of a stacked group of utensils while the gripper device is rotated. In addition, the first conveyor includes an ejection mechanism for removing the runners therefrom after all of the utensils have been separated and transferred.

It is yet another object of the invention to provide a controller connected with the first conveyor, the gripper device and the robotic transfer mechanism in order to synchronize the operation thereof for successive and continuous transfer of a plurality of utensils from a mold machine to a packaging assembly.

According to a further object of the invention, a second conveyor is arranged beneath the ejection mechanism to transport the ejected runners to a recycling station.

BRIEF DESCRIPTION OF THE FIGURES

Other objects and advantages of the invention will become apparent from a study of the following specification when viewed in the light of the accompanying drawing, in which:

FIG. 1 is a top plan view of the robotic loading cell according to the invention;

FIG. 2 is a perspective view of the robotic transfer mechanism according to the invention;

DETAILED DESCRIPTION

Referring first to FIG. 1, the basic components of the robotic loading cell according to the invention are shown. These include a first infeed conveyor 2, a robotic transfer mechanism 4, and a gripper device 6 attached to the arm of the robotic transfer mechanism. A controller 8 is connected with the conveyor, transfer mechanism and gripper to synchronize the operation thereof as will be developed below.

Figure 3:
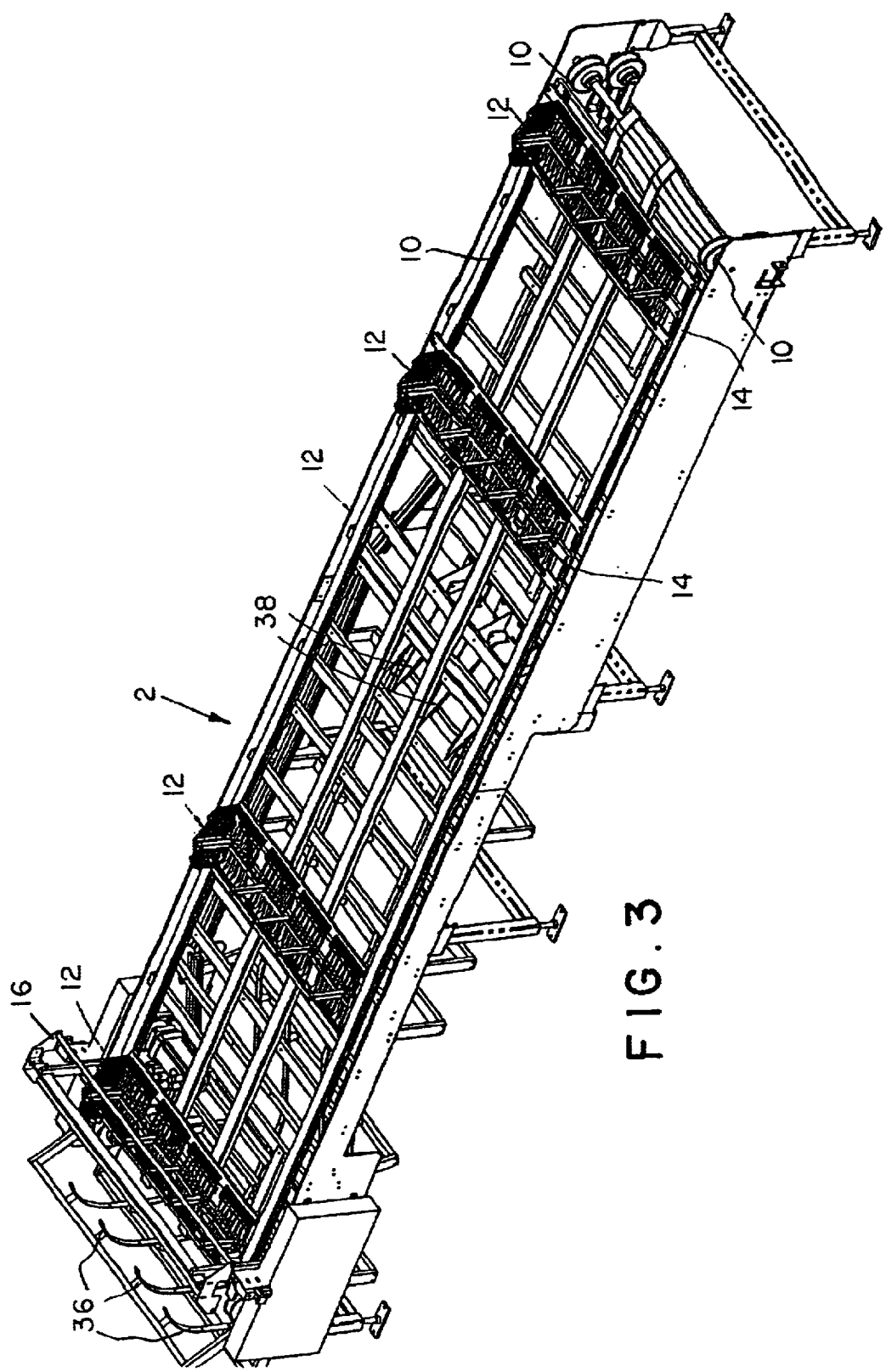
FIG. 3 is a perspective view of the first conveyor according to the invention.
Figure 4:
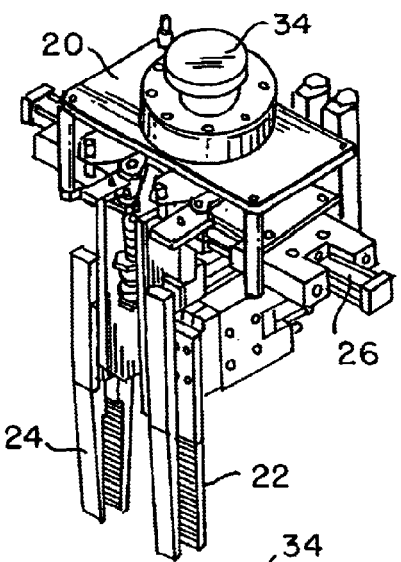
FIGS. 4, 5, 6, and 7 are perspective, front, right side, and top views, respectively, of the gripper device according to the invention.
Figure 5:
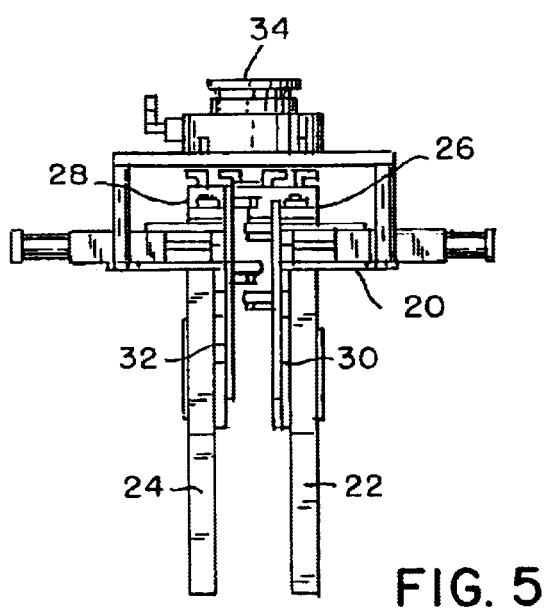
Figure 6:
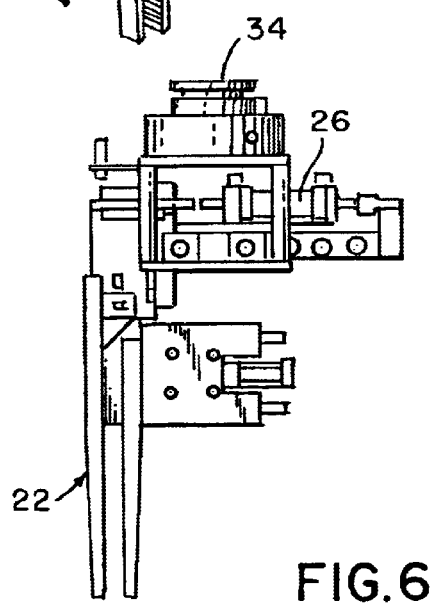
Figure 7:
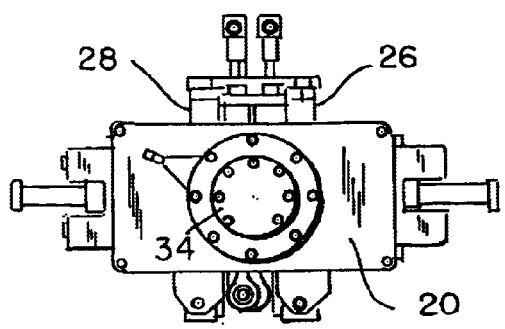
Figure 8:
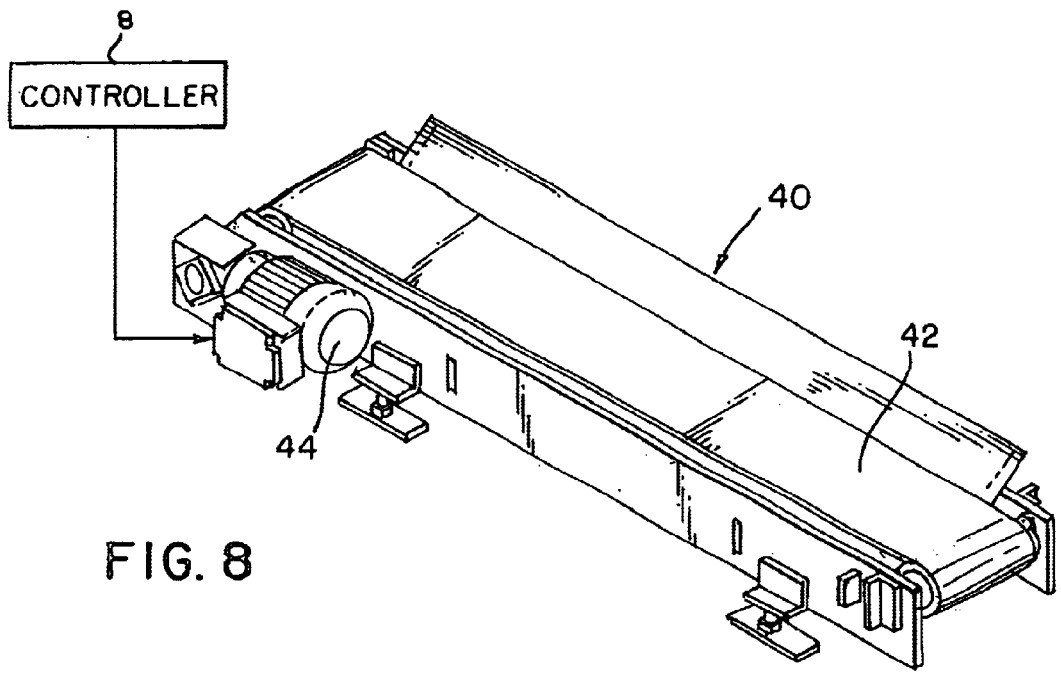
FIGS. 8, 9, 10, and 11 are perspective, front, right side, and to views, respectively, of the second conveyor according to the invention.
Figure 10:
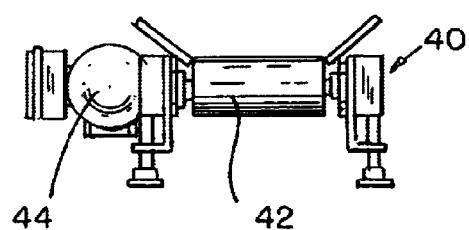
Figure 9:
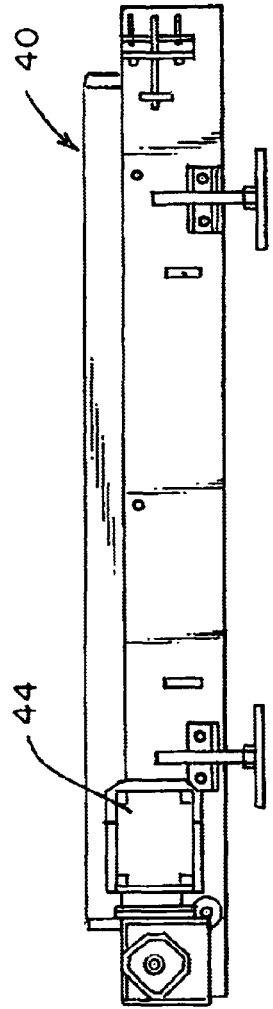
Figure 11:
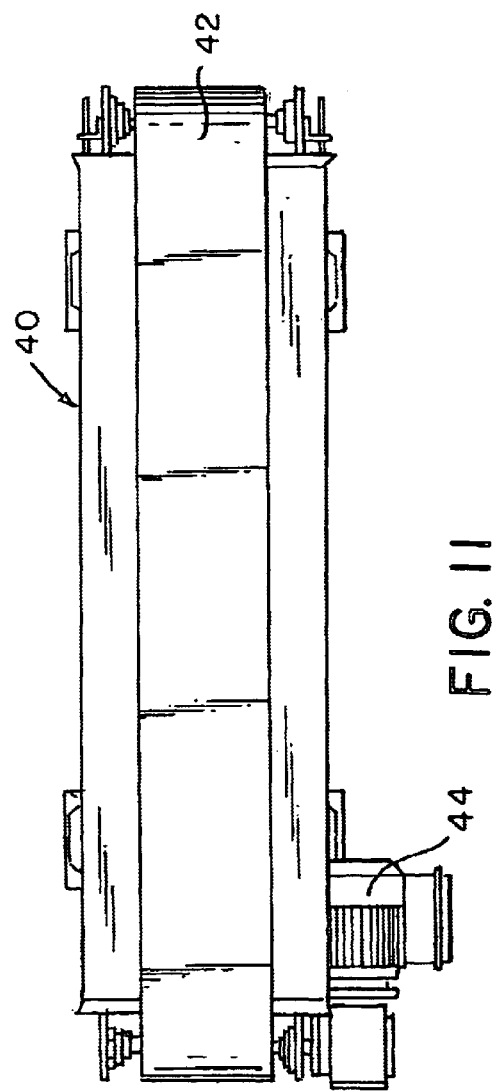

The first conveyor 2 is shown in greater detail in FIG. 3. It includes two pairs of drive chains 10 on which are mounted spaced loading stations 12, four of which are shown in the drawing. One drive is for two of the loading stations and a second drive is for the other two loading stations. At the near end of the conveyor, molded synthetic plastic utensils are deposited simultaneously on the first two loading stations. The utensils, such as forks, knives, or spoons, are delivered from a mold (not shown) which produces a plurality of utensils integrally connected by a plastic runner to form a group or rack of utensils. A plurality of racks can be stacked at each location on the conveyor. To assist with stacking and to maintain the racks in alignment, vertically extending fingers 14 are provided on each loading station to receive the racks. When the appropriate number of racks have been stacked, the drive chains are operated to index movement of the loading stations from the load end of the first conveyor to the transfer end at the far end of the first conveyor. At the far end, a clamp 16 is applied to clamp the stacked racks against the first conveyor. The clamp engages the stacked racks along the runner and rib portions thereof.

Separate servo motors (not shown) are provided to index the drive chains of the first conveyor to incrementally move the loading stations toward the robotic transfer mechanism 4. A suitable robotic mechanism is shown in FIG. 2 and comprises a Fanuc M 710i six axis articulated type robot designed for high speed handling. Of course, other robotic devices could be used as well.

Attached to the arm of the robot is the gripper device which is shown in more detail in FIGS. 4–7. The gripper device includes a frame 20 from which depend two pairs of fingers 22, 24, which are operable by corresponding cylinders 26, 28 and pivot arms 30, 32. More particularly, the pairs of gripper fingers 22, 24 are laterally displaceable by the cylinders between a gripping position where the fingers of each pair are moved toward each other to grip a utensil from at least one rack and a release position where the fingers of each pair are moved away from each other to release the utensil.

The gripper device includes an adapter plate 24 for attachment to the arm of the robotic transfer device. When a full stack of molded utensil racks is arranged adjacent to the robot, the robot positions the gripper device so that the fingers thereof pass downwardly through the stacked racks on either side of a first utensil. Because the racks include two sets of utensils on opposite sides of a central rib, the gripper fingers 22 are on opposite sides of a first utensil on one side of the rib and the gripper fingers 24 are on opposite sides of a first utensil on the other side of the rib. The fingers are then displaced to the gripping position under control of the controller. Next, the fingers are rotated, preferably about 45° in opposite directions, to break or sever the gripped utensils from the runners of the corresponding racks. The robotic transfer mechanism then raises the gripping device to remove the utensils, with each pair of fingers retaining a number of aligned utensils corresponding to the number of racks.

The transfer mechanism then positions the gripping device adjacent to a packaging assembly (not shown) where the gripping fingers are displaced to their release position and the utensils are deposited in chutes leading to packaging, such as poly bags, with the utensils preferably being maintained in an aligned configuration.

The transfer mechanism then returns the gripping device to the loading station and positions the fingers relative to the second utensils on opposite sides of the ribs of the stacked racks and the process is repeated to sever and transfer a second group of utensils to the packaging area. Once all of the utensils have been removed from the stacked racks, the conveyor is indexed to bring the next loading station filled with racks of molded utensils to the severing and transfer position adjacent to the robotic transfer mechanism. The two drive servo motors operate independently to index the loading stations. The loading stations at the near end of the conveyor are loaded by the mold machine and their drive chains are operated by the first servo motor. Once loaded, they are transferred to the rear portion of the conveyor by the first servo motor for indexing under control of the second servo motor in accordance with the operation of the robotic transfer mechanism.

The remaining runner portions of the stacked racks are retained on the conveyor loading stations. The second servo motor drives the emptied loading stations around the end of the conveyor where guides 36 (FIG. 3) are provided to retain the runner portions thereon. As the loading stations pass beneath the conveyor, they encounter ejectors 38 which remove the leftover runner portions from the conveyor.

A second waste conveyor 40 is provided beneath the ejectors of the first conveyor 2. The waste conveyor, which is shown in FIGS. 8–11, includes a belt 42 driven by a motor 44 under control of the controller 8 to receive the runner material from the ejectors. The waste conveyor feeds the runners to a shredder (not shown) where the runners are shredded for recycling.

By programming the controller 8 in a known manner, indexing movement of the supply conveyor 2 and operation of the gripper fingers and robotic transfer mechanism can be coordinated to efficiently package individual plastic utensils from racks of utensils manufactured by a mold machine.

If desired, position detectors and sensors may be provided in the first conveyor and gripping device to provide feedback signals to the controller to assist the controller in accurately positioning and indexing the operation of the loading cell.

Although the gripping device is shown having two pairs of fingers in accordance with a preferred embodiment of the invention, a device with only one pair of fingers or more than two pairs of fingers could easily be provided in accordance with the invention. Moreover, more than one gripping device can be provided, as can more than one robotic transfer mechanism.

While the preferred forms and embodiments of the invention have been illustrated and described, it will be apparent to those of ordinary skill in the art that various changes and modifications may be made without deviating from the inventive concepts set forth above.

What is claimed is:

1. Apparatus for loading utensils, comprising
   (a) a first conveyor for delivering at least one group of molded utensils which are interconnected via a runner,
   (b) a gripper device for gripping and removing at least one utensil from said group of utensils, said gripper device further comprising at least one pair of fingers which arc laterally displaceable between a gripping position where said fingers are moved toward each other to grip a utensil and a release position where said fingers are moved away from each other to release said utensil, said gripper device being rotatable about an axis to twist said utensil and sever it from said runner; and
   (c) a robotic transfer mechanism connected with said gripper device to laterally displace said gripper device is displaced laterally relative to said group of utensils to successively sever adjacent utensils from said runner for each loading cycle, and to transfer the utensil from said first conveyor to a packaging assembly.

2. Apparatus as defined in claim 1, wherein said first conveyor includes a clamping mechanism to clamp said molded runner against said first conveyor.

3. Apparatus as defined in claim 2, wherein said first conveyor further includes a drive assembly for intermittently driving said conveyor to deliver said molded utensils from a molding device to said gripper device.

4. Apparatus as defined in claim 3, wherein said first conveyor further includes two pairs of drive chains connected with said drive assembly, said drive chains including prongs for aligning a plurality of groups of molded utensils in stacked relation, whereby said gripper device simultaneously removes a plurality of stacked utensils from a stacked plurality of groups.

5. Apparatus as defined in claim 4, wherein said first conveyor further includes a plurality of ejectors for removing said runners from said first conveyor after all of said utensils have been separated from said runners.

6. Apparatus as defined in claim 1, and further comprising a second conveyor arranged beneath said ejectors of said first conveyor for transporting said runners therefrom.

7. Apparatus as defined in claim 1, and further comprising a controller connected with said first conveyor, said gripper device and said robotic transfer mechanism for synchronizing the operation thereof.

8. Apparatus as defined in claim 1, wherein said gripper device comprises two pair of fingers for simultaneously gripping and severing two stacks of utensils.

* * * * *